US010475146B2

(12) United States Patent
Lee et al.

(10) Patent No.: US 10,475,146 B2
(45) Date of Patent: Nov. 12, 2019

(54) DEVICE FOR CONTROLLING MULTIPLE AREAS OF DISPLAY INDEPENDENTLY AND METHOD THEREOF

(71) Applicant: Samsung Electronics Co., Ltd., Suwon-si, Gyeonggi-do (KR)

(72) Inventors: Do Hyung Lee, Yongin-si (KR); Nam Hoi Kim, Suwon-si (KR); Byung Jin Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/183,042

(22) Filed: Jun. 15, 2016

(65) Prior Publication Data

US 2016/0364833 A1    Dec. 15, 2016

(30) Foreign Application Priority Data

Jun. 15, 2015    (KR) .................. 10-2015-0084173

(51) Int. Cl.
*G06T 1/20* (2006.01)
*G06T 3/40* (2006.01)
*G09G 5/38* (2006.01)
*G09G 5/14* (2006.01)

(52) U.S. Cl.
CPC .............. *G06T 1/20* (2013.01); *G06T 3/40* (2013.01); *G09G 5/14* (2013.01); *G09G 5/38* (2013.01); *G09G 2360/06* (2013.01)

(58) Field of Classification Search
CPC ... G06T 1/20; G06T 3/40; G06T 11/00; G06F 3/04842; G06F 3/04845; G06F 3/04886; G06F 2203/04803; G09G 1/007; G09G 5/14; G09G 5/38; G09G 2300/04; G09G 2320/0686; G09G 2360/06
USPC .......................................................... 345/660
See application file for complete search history.

(56) References Cited

U.S. PATENT DOCUMENTS

| 7,864,134 | B2 | 1/2011 | Kim et al. | |
| 2005/0140566 | A1 | 6/2005 | Kim et al. | |
| 2009/0289874 | A1* | 11/2009 | Ha | H04N 5/64 345/1.3 |
| 2011/0013088 | A1* | 1/2011 | Rozen | G09G 5/006 348/571 |

(Continued)

FOREIGN PATENT DOCUMENTS

| EP | 2626852 A2 | 8/2013 |
| EP | 2720132 A2 | 4/2014 |

(Continued)

*Primary Examiner* — William A Beutel
(74) *Attorney, Agent, or Firm* — Jefferson IP Law, LLP

(57) ABSTRACT

An electronic device and a method performed in the electronic device are provided. The electronic device includes a display module, and a first processor and a second processor that are electrically connected with the display module. The first processor is configured to detect an operation performed in the electronic device, determine a range of display control authority to be provided to the second processor according to the operation, and provide the range of the display control authority to the second processor. The second processor is configured to generate a display screen corresponding to the range of the display control authority and provide the display screen through the display module.

13 Claims, 16 Drawing Sheets

(56) References Cited

U.S. PATENT DOCUMENTS

| | | | |
|---|---|---|---|
| 2013/0145311 A1* | 6/2013 | Joo | G06F 3/04886 715/788 |
| 2013/0201176 A1* | 8/2013 | Lee | G09G 5/003 345/214 |
| 2014/0022185 A1* | 1/2014 | Ribeiro | G06F 3/0412 345/173 |
| 2014/0063033 A1* | 3/2014 | Bae | G06T 1/60 345/545 |
| 2014/0101575 A1 | 4/2014 | Kwak et al. | |
| 2014/0181736 A1 | 6/2014 | Dong et al. | |
| 2014/0267091 A1* | 9/2014 | Kim | G06F 1/1652 345/173 |
| 2014/0313119 A1 | 10/2014 | Cho et al. | |
| 2014/0333608 A1* | 11/2014 | Okairi | G09G 3/3648 345/214 |
| 2015/0015511 A1* | 1/2015 | Kwak | G06F 3/0412 345/173 |
| 2015/0015512 A1 | 1/2015 | Kwak et al. | |
| 2015/0015513 A1 | 1/2015 | Kwak et al. | |
| 2015/0109400 A1 | 4/2015 | Wang | |
| 2015/0261376 A1* | 9/2015 | Kim | G06F 3/0487 345/173 |
| 2015/0346939 A1 | 12/2015 | Kwak et al. | |
| 2015/0346991 A1 | 12/2015 | Kwak et al. | |
| 2016/0011678 A1 | 1/2016 | Kwak et al. | |
| 2016/0291865 A1 | 10/2016 | Kwak et al. | |

FOREIGN PATENT DOCUMENTS

| | | |
|---|---|---|
| KR | 10-2005-0057702 A | 6/2005 |
| KR | 10-2014-0126492 A | 10/2014 |

* cited by examiner

DEVICE FOR CONTROLLING MULTIPLE AREAS OF DISPLAY INDEPENDENTLY AND METHOD THEREOF

CROSS-REFERENCE TO RELATED APPLICATION(S)

This application claims the benefit under 35 U.S.C. § 119(a) of a Korean patent application filed on Jun. 15, 2015 in the Korean Intellectual Property Office and assigned Serial number 10-2015-0084173, the entire disclosure of which is hereby incorporated by reference.

TECHNICAL FIELD

The present disclosure relates to an electronic device for controlling multiple areas of a display independently and a method thereof.

BACKGROUND

The development of communication technology has accompanied network facilities, such as base stations, over the whole land. Electronic devices, transmitting and receiving data to and from other electronic devices through networks, have allowed users to freely use the networks. Various kinds of electronic devices have evolved to provide diverse functions along the recent trend of digital convergence. For example, a smartphone supports internet access through a network, the playback of music or video, and the photographing of pictures or video by an image sensor.

On the merits of such usefulness with electronic devices, it is usual for people to daily carry the electronic devices. For that reason, electronic devices are increasingly required to be lighter and thinner while maintaining a proper size of display. Under such requirements, bezels of the electronic devices are becoming gradually smaller for spatial efficiency in limited areas thereof. Moreover, there is a related problem regarding battery duration because such an electronic device is normally always carried by a user. Therefore, electronic devices are being developed to have lower power consumption on the part of both hardware and software.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for controlling multiple areas of a display independently and a method thereof.

In accordance with an aspect of the present disclosure, an electronic device is provided. The electronic device includes a display module, and a first processor and a second processor that are electrically connected with the display module. The first processor is configured to detect an operation of the electronic device, determine a range of display control authority to be provided to the second processor according to the operation, and provide the range of the display control authority to the second processor. The second processor is configured to generate a display screen corresponding to the range of the display control authority and provide the display screen through the display module.

In accordance with another aspect of the present disclosure, a method performed in an electronic device including a first processor and a second processor is provided. The method includes detecting an operation, which is performed in the electronic device, by the first processor, determining a range of display control authority to be provided to the second processor by the first processor according to the operation, generating a display screen by the second processor in correspondence with the range of the display control authority, and providing the display screen to a display of the electronic device by the second processor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
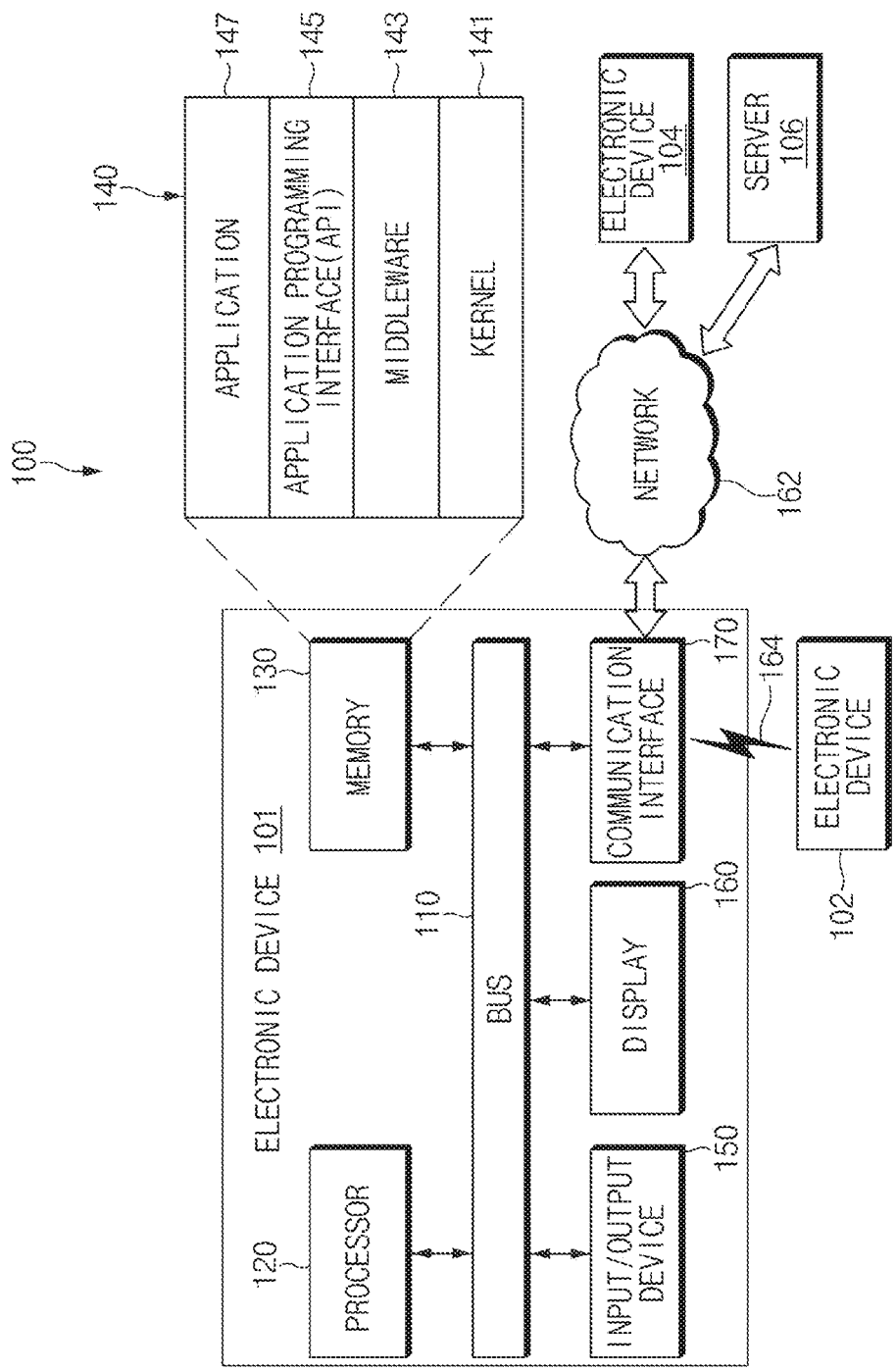
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", "may include", "comprise", or "may comprise" used herein indicate existence of corresponding features (e.g., numerical values, functions, operations, or components) but does not exclude other features.

As used herein, the terms "A or B", "at least one of A or/and B", or "one or more of A or/and B" may include all allowable combinations which are enumerated together. For example, the terms "A or B", "at least one of A and B", or "at least one of A or B" may indicate all cases of: (1) including at least one A, (2) including at least one B, or (3) including both at least one A, and at least one B.

As used herein, the terms such as "1st", "2nd", "first", "second", and the like may be used to qualify various elements regardless of their order and/or priority, simply differentiating one from another, but do not limit those elements thereto. For example, both a first user device and a second user device indicate different user devices. For example, a first element may be referred to as a second element and vice versa without departing from the scope of the present disclosure.

As used herein, if one element (e.g., a first element) is referred to as being "operatively or communicatively connected with/to" or "connected with/to" another element (e.g., a second element), it should be understood that the former may be directly coupled with the latter, or connected with the latter via an intervening element (e.g., a third element). Otherwise, it will be understood that if one element is referred to as being "directly coupled with/to" or "directly connected with/to" with another element, it may be understood that there is no intervening element (e.g., a third element) existing between them.

In the description or claims, the term "configured to" (or "set to") may be changeable with other implicative meanings such as "suitable for", "having the capacity to", "designed to", "adapted to", "made to", or "capable of", and may not simply indicate "specifically designed to". Alternatively, in some circumstances, a term "a device configured to" may indicate that the device "may do" something together with other devices or components. For instance, a term "a processor configured to (or set to) perform A, B, and C" may indicate a generic-purpose processor (e.g., central processing unit (CPU) or application processor (AP)) capable of performing its relevant operations by executing one or more software or programs which are stored in an exclusive processor (e.g., embedded processor), which is prepared for the operations, or in a memory.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevantly related art and not in an idealized or overly formal detect unless expressly so defined herein in various embodiments of the present disclosure. In some cases, terms even defined in the specification may not be understood as excluding embodiments of the present disclosure.

An electronic device according to various embodiments of the present disclosure may include, for example, at least one of smartphones, tablet personal computers (PCs), mobile phones, video telephones, electronic book readers, desktop PCs, laptop PCs, netbook computers, workstations, servers, personal digital assistants (PDA), portable multimedia players (PMP), Moving Picture Experts Group (MPEG-1 or MPEG-2) audio layer-III (MP3) players, mobile medical devices, cameras, wearable devices. According to various embodiments of the present disclosure, the wearable devices may include at least one of accessories (e.g., watches, rings, bracelets, anklets, necklaces, glasses, contact lenses, or head-mounted devices (HMD)), assembled textiles or clothes (e.g., electronic apparel), body-attachable matters (e.g., skin pads or tattoos), or implantable devices (e.g., implantable circuits).

In various embodiments of the present disclosure, an electronic device may be a smart home appliance. The smart home appliance, for example, may include at least one of televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, Google TV™, and the like), game consoles (e.g., Xbox™, PlayStation™, and the like), electronic dictionaries, electronic keys, camcorders, electronic picture frames, and the like.

In other embodiments of the present disclosure, an electronic device may include at least one of diverse medical devices (e.g., portable medical measuring instruments (blood-sugar measuring instruments, heart-pulsation measuring instruments, blood-pressure measuring instruments, or body-temperature measuring instruments), magnetic resonance angiography (MRA) equipment, magnetic resonance imaging (MRI) equipment, computed tomography (CT) equipment, scanners, and ultrasonic devices), navigation device, global positioning system (GPS) receiver, event data recorder (EDR), flight data recorders (FDR), vehicle infotainment devices, electronic equipment for vessels (e.g., navigation systems and gyrocompasses), avionics, security devices, head units for vehicles, industrial or home robots, automatic teller's machines (ATM) for financial agencies, points of sales (POS) for stores, and internet of things (e.g., electric bulbs, diverse sensors, electric or gas meter, spring cooler units, fire alarms, thermostats, road lamps, toasters, exercise implements, hot water tanks, boilers, and the like).

According to various embodiments of the present disclosure, an electronic device may include at least one of parts of furniture or buildings/structures having communication functions, electronic boards, electronic-signature receiving devices, projectors, and diverse measuring instruments (e.g., water meters, electricity meters, gas meters, and wave meters) including metal cases. In various embodiments of the present disclosure, an electronic device may be one or more combinations of the above-mentioned devices. Electronic devices according to various embodiments may be flexible electronic devices. Additionally, electronic devices according to various embodiments of the present disclosure may not be restrictive to the above-mentioned devices, rather may include new electronic devices emerging by way of technical development.

Hereinafter, an electronic device according to various embodiments will be described in conjunction with the accompanying drawings. In description for various embodiments of the present disclosure, the term "user" may refer to a person using an electronic device or a device (e.g., an artificial intelligent electronic device) using an electronic device.

In the accompanied drawings, an electronic device according to various embodiments of the present disclosure is exemplified as a smartphone hereafter.

FIG. 1 illustrates an electronic device in a network environment according to various embodiments of the present disclosure.

Referring to FIG. 1, an electronic device 101 in a network environment 100 according to various embodiments will be described below. The electronic device 101 may include a bus 110, a processor 120, a memory 130, an input/output (I/O) interface 150, a display 160, and a communication interface 170. In various embodiments of the present disclosure, the electronic device 101 may exclude at least one of the elements therefrom or further include another element therein.

The bus 110, for example, may include a circuit for connecting the elements 110~170 to each other and for relaying communication (control messages and/or data) between the elements.

The processor 120 may include at least one or more of a CPU, an AP, and a communication processor (CP). The processor 120, for example, may execute computation or data operation for control and/or communication of other elements of at least one of the electronic device 101.

The memory 130 may include a volatile and/or nonvolatile memory. The memory 130 may store, for example, instructions or data which are involved in at least one of other elements in the electronic device 101. According to an embodiment of the present disclosure, the memory 130 may store software and/or programs 140 therein. The programs 140 may include, for example, a kernel 141, middleware 143, an application programming interface (API) 145, and/or an application program (or "application") 147. At least a part of the kernel 141, the middleware 143, or the API 145 may be referred to as an operating system (OS).

The kernel 141 may control or manage, for example, system resources (e.g., the bus 110, the processor 120, or the memory 130) which are used for executing operations or functions implemented in other programs (e.g., the middleware 143, the API 145, or the application program 147). Additionally, the kernel 141 may provide an interface capable of controlling or managing system resources by approaching individual elements of the electronic device 101 from the middleware 143, the API 145, or the application program 147.

The middleware 143 may perform a mediating function to allow, for example, the API 145 or the application program 147 to communicate and exchange data with the kernel 141.

Additionally, the middleware 143 may process one or more work requests, which are received from the application program 147, in priority. For example, the middleware 143 may give priority which permits at least one of the application program 147 to use a system resource (e.g., the bus 110, the processor 120, or the memory 130) of the electronic device 101. For example, middleware 143 may perform scheduling or load balancing operations for the one or more work requests by processing the one or more work requests in accordance with the priority which is given to at least one of the application program 147.

The API 145 may be, for example, an interface for allowing the application 147 to control a function which is provided from the kernel 141 or the middleware 143. For example, the API 145 may include at least one interface or function (e.g., instructions) for file control, window control, or character control.

The I/O interface 150 may act, for example, an interface capable of transferring instructions or data, which are input from a user or another external device, to another element (or other elements) of the electronic device 101. Additionally, the I/O interface 150 may output instructions or data, which are received from another element (or other elements) of the electronic device 101, to a user or another external device.

The display 160 may include, for example, a liquid crystal display (LCD), a light emitting diode (LED), an organic LED (OLED) display, a microelectromechanical system (MEMS) display, or an electronic paper. The display 160 may display, for example, diverse contents (e.g., text, image, video, icon, or symbol) to a user. The display 160 may include a touch screen, and for example may receive an input of a touch, gesture, approach, or hovering which is made by using an electronic pen or a part of a user's body.

The communication interface 170 may set, for example, a communication condition between the electronic device 101 and an external electronic device (e.g., a first external electronic device 102, a second external electronic device 104, or a server 106). For example, the communication interface 170 may communicate with an external electronic device (e.g., the second external electronic device 104 or the server system 106) in connection with a network 162 through wireless communication or wired communication.

The wireless communication may use, for example, at least one of long-term evolution (LTE), LTE-advanced (LTE-A), code division multiple access (CDMA), wideband-CDMA (WCDMA), universal mobile telecommunication system (UMTS), wireless broadband (WiBro), or global system for mobile communication (GSM). The wireless communication may include, for example, a short range communication 164. The short range communication 164 may include, for example, at least one of Wi-Fi, Bluetooth (BT), near field communication (NFC), or GPS. The wired communication may include, for example, at least one of universal serial bus (USB), high definition multimedia interface (HDMI), recommended standard 232 (RS-232), or plain old telephone service (POTS). The network 162 may include a telecommunication network, for example, at least one of a computer network (e.g., local area network (LAN) or wireless area network (WAN)), Internet, or a telephone network.

Each of the first and second external electronic devices 102 and 104 may be same with or different from the electronic device 101. According to an embodiment of the present disclosure, the server 106 may include a group of one or more servers. According to various embodiments of the present disclosure, all or a part of operations executed in the electronic device 101 may be executed in another one or a plurality of electronic devices (e.g., the electronic device 102 or 104, or the server 106). According to an embodiment of the present disclosure, in case there is a need of performing a function or service automatically or by a request for the electronic device 101, the electronic device 101 may request at least a part of the function or service, additionally or instead of executing by itself, from another device (e.g., the electronic device 102 or 104, or the server 106). Such another device (e.g., the electronic device 102 or 104, or the sever 106) may execute such a requested or additional function and then transfer a result of the execution of the function. The electronic device 101 may process a received result, as it is or additionally, to provide the requested function or service. To this end, for example, it may be available to adopt a cloud computing, distributed computing, or client-server computing technique.

Figure 2:
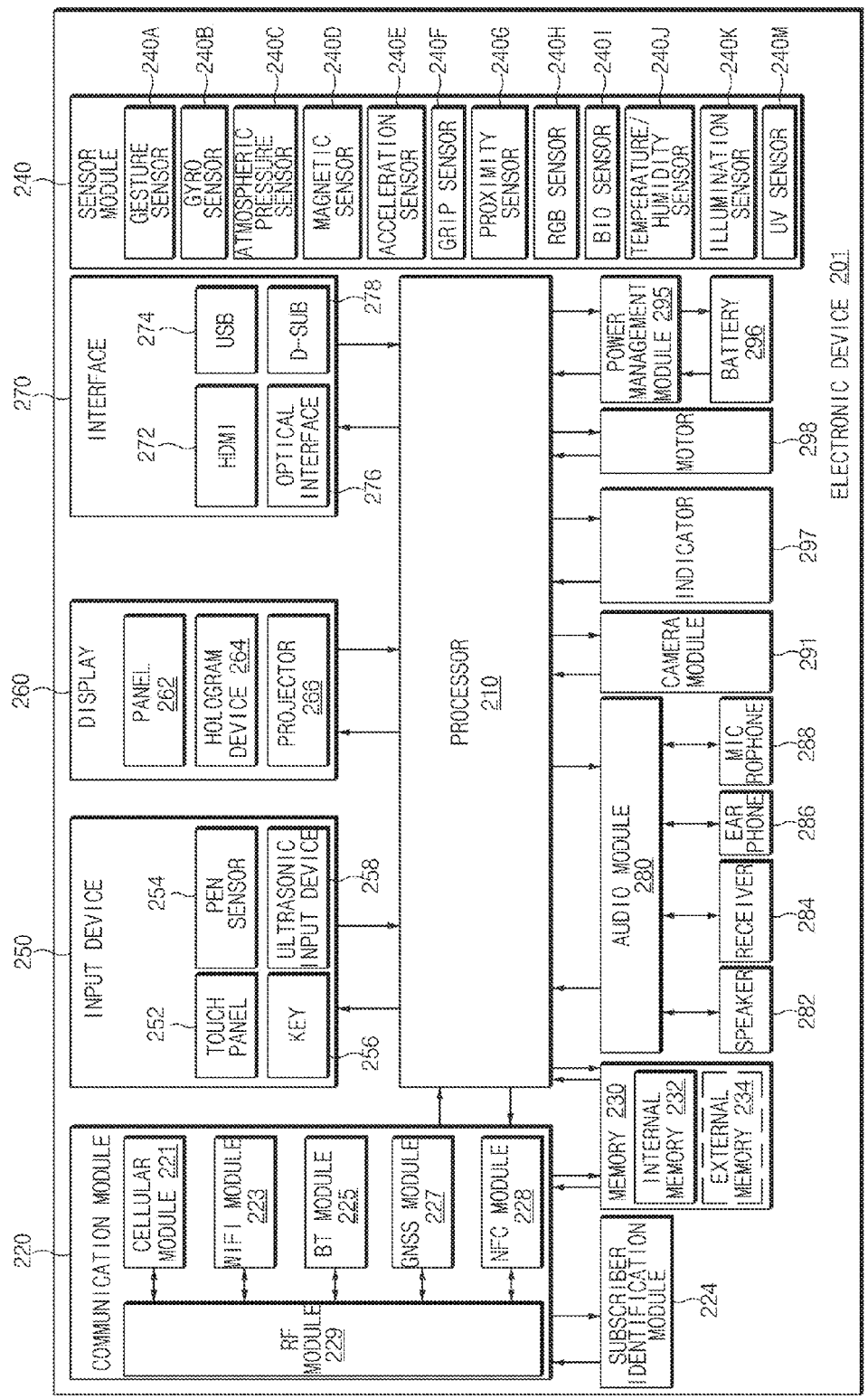
FIG. 2 is a block diagram illustrating an electronic device according to various embodiments of the present disclosure.

FIG. 2 is a block diagram illustrating an electronic device 201 according to various embodiments of the present disclosure. For example, the electronic device 201 may include all or a part of elements of the electronic device 101 shown in FIG. 1. The electronic device 201 may include one or more APs 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

Referring to FIG. 2, the AP 210 may drive an OS or an application to control a plurality of hardware or software elements connected to the processor 210, and may process and compute many kinds of data. The processor 210 may be implemented with a system-on-chip (SoC), for example. According to an embodiment of the present disclosure, the processor 210 may further include a graphic processing unit (GPU) and/or an image signal processor (ISP). The processor 210 may even include at least a part of the elements shown in FIG. 2. The processor 210 may process instructions or data, which are received from at least one of other elements (e.g., a nonvolatile memory), and then store diverse data into such a nonvolatile memory.

The communication module 220 may have a configuration same with or similar to the communication interface 170 of FIG. 1. The communication module 220 may include a cellular module 221, a Wi-Fi module 223, a BT module 225, a global navigation satellite system (GNSS) module 227 (e.g., a GPS module, a global navigation satellite system (GLONASS) module, a Beidou module, or a Galileo module), an NFC module 228, and a radio frequency (RF) module 229.

The cellular module 221 may provide voice call, video call, a character service, or an Internet service through a communication network. According to an embodiment of the present disclosure, the cellular module 221 may perform discrimination and authentication of an electronic device within a communication network using a SIM (e.g., a SIM card) 224. According to an embodiment of the present disclosure, the cellular module 221 may perform at least a portion of functions that the processor 210 provides. According to an embodiment of the present disclosure, the cellular module 221 may include a CP.

Each of the Wi-Fi module 223, the BT module 225, the GNSS module 227, and the NFC module 228 may include a processor for processing data exchanged through a corresponding module, for example. In various embodiments of the present disclosure, at least a part (e.g., two or more elements) of the cellular module 221, the Wi-Fi module 223, the BT module 225, the GNSS module 227, and the NFC module 228 may be included in one integrated circuit (IC) or an IC package.

The RF module 229 may transmit and receive, for example, communication signals (e.g., RF signals). The RF module 229 may include a transceiver, a power amplifier module (PAM), a frequency filter, a low noise amplifier (LNA), or an antenna. According to another embodiment of the present disclosure, at least one of the cellular module 221, the Wi-Fi module 223, the BT module 225, the GNSS module 227, and the NFC module 228 may transmit and receive an RF signal through a separate RF module.

The SIM 224 may include, for example, a card, which has a SIM, and/or an embedded SIM, and include unique identifying information (e.g., integrated circuit card identifier (ICCID)) or subscriber information (e.g., integrated mobile subscriber identify (IMSI)).

The memory 230 (e.g., the memory 130) may include, for example, an embedded (internal) memory 232 or an external memory 234. For example, the embedded memory 232 may include at least one of a volatile memory (e.g., a dynamic random access memory (DRAM), a static RAM (SRAM), a synchronous DRAM (SDRAM), etc.), a nonvolatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, etc.), a hard drive, or solid state drive (SSD).

The external memory 234 may further include a flash drive, for example, a compact flash (CF), a secure digital (SD), a micro-SD (SD), a mini-SD, an extreme digital (xD), or a memory stick. The external memory 234 may be functionally and/or physically connected with the electronic device 201 through various interfaces.

The sensor module 240 may measure, for example, a physical quantity, or detect an operation state of the electronic device 201, to convert the measured or detected information into an electric signal. The sensor module 240 may include at least one of a gesture sensor 240A, a gyro sensor 240B, a barometer pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illuminance (illumination) sensor 240K, or an ultraviolet (UV) sensor 240M. Additionally or alternatively, though not shown, the sensor module 240 may further include an E-nose sensor, an electromyography sensor (EMG) sensor, an electroencephalogram (EEG) sensor, an electrocardiogram (ECG) sensor, an infrared (IR) sensor, an iris sensor, or a fingerprint sensor, for example. The sensor module 240 may further include a control circuit for controlling at least one or more sensors included therein. In various embodiments of the present disclosure, the electronic device 201 may further include a processor, which is configured to control the sensor module 240, as a part or additional element, thus controlling the sensor module 840 while the processor 210 is in a sleep state.

The input unit 250 may include, for example, a touch panel 252, a (digital) pen sensor 254, a key 256, or an ultrasonic input device 258. The touch panel 252 may recognize, for example, a touch input using at least one of a capacitive type, a resistive type, an IR type, or an ultrasonic wave type. Additionally, the touch panel 252 may further include a control circuit. The touch panel 252 may further include a tactile layer to provide a tactile reaction for a user.

The (digital) pen sensor 254 may be a part of the touch panel 252, or a separate sheet for recognition. The key 256, for example, may include a physical button, an optical key, or a keypad. The ultrasonic input device 258 may allow the electronic device 201 to detect a sound wave using a microphone (e.g., a microphone 288), and determine data through an input tool generating an ultrasonic signal.

The display 260 (e.g., the display 160) may include a panel 262, a hologram device 264, or a projector 266. The panel 262 may include the same or similar configuration with the display 160 of FIG. 1. The panel 262, for example, may be implemented to be flexible, transparent, or wearable. The panel 262 and the touch panel 262 may be implemented in one module. The hologram device 264 may show a three-dimensional image in a space using interference of light. The projector 266 may project light onto a screen to display an image. The screen, for example, may be positioned in the inside or outside of the electronic device 201. According to an embodiment of the present disclosure, the display 260 may further include a control circuit for controlling the panel 262, the hologram device 264, or the projector 266.

The interface 270, for example, may include a HDMI 272, a USB 274, an optical interface 276, or a D-subminiature (D-sub) 278. The interface 270 may include, for example, the communication interface 170 shown in FIG. 1. The interface 270, for example, may include a mobile high definition link (MHL) interface, an SD card/multimedia card (MMC) interface, or an Infrared data association (IrDA) standard interface.

The audio module 280 may convert a sound and an electric signal in dual directions. At least one element of the audio module 280 may include, for example, the I/O interface 145 shown in FIG. 1. The audio module 280, for example, may process sound information that is input or output through the speaker 282, the receiver 284, the earphone 286, or the microphone 288.

The camera module 291 may be a unit which is capable of taking a still picture and a moving picture. According to an embodiment of the present disclosure, the camera module 291 may include one or more image sensors (e.g., a front sensor or a rear sensor), a lens, an ISP, or a flash (e.g., an LED or a xenon lamp).

The power management module 295 may manage, for example, power of the electronic device 201. The power management module 295 may include, for example, a power management integrated circuit (PMIC) a charger IC, or a battery or fuel gauge. The PMIC may operate in wired and/or wireless charging mode. A wireless charging mode may include, for example, diverse types of magnetic resonance, magnetic induction, or electromagnetic wave. For the wireless charging, an additional circuit, such as a coil loop circuit, a resonance circuit, or a rectifier, may be further included therein. The battery gauge, for example, may measure a remnant of the battery 296, a voltage, a current, or a temperature during charging. The battery 296 may measure, for example, a residual, a voltage on charge, a current, or temperature thereof. The battery 296 may include, for example, a rechargeable battery and/or a solar battery.

The indicator 297 may display the following specific state of the electronic device 201 or a part (e.g., the processor 210) thereof: a booting state, a message state, or a charging state. The motor 298 may convert an electric signal into mechanical vibration and generate a vibration or haptic effect. Although not shown, the electronic device 201 may include a processing unit (e.g., a graphics processing unit (GPU)) for supporting a mobile TV. The processing unit for supporting the mobile TV, for example, may process media data that is based on the standard of digital multimedia broadcasting (DMB), digital video broadcasting (DVB), or media flow (MediaFlo™).

Each of the above-described elements of the electronic device according to various embodiments of the present disclosure may be implemented using one or more components, and a name of a relevant component may vary with on the kind of the electronic device. The electronic device according to various embodiments of the present disclosure may include at least one of the above components. Also, a part of the components may be omitted, or additional other components may be further included. Also, some of the components of the electronic device according to the present disclosure may be combined to form one entity, thereby making it possible to perform the functions of the relevant components substantially the same as before the combination.

Figure 3:
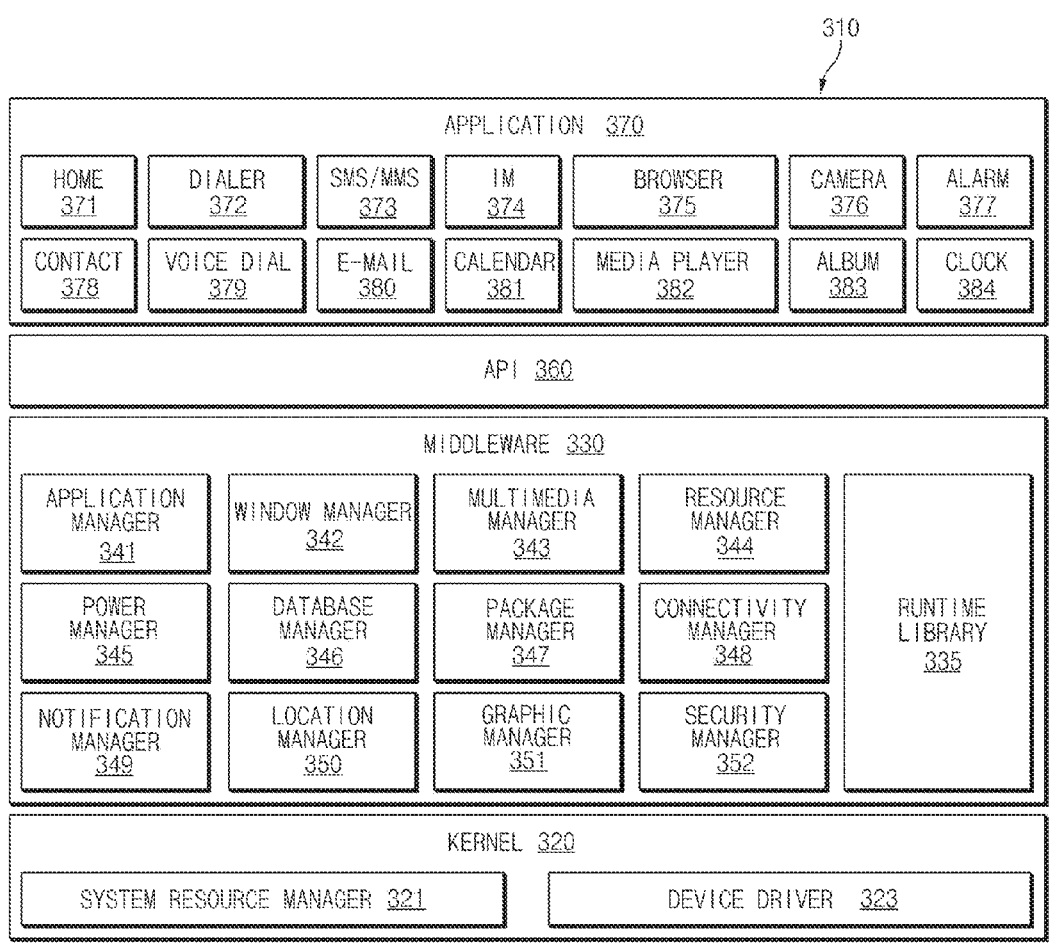
FIG. 3 is a block diagram illustrating a program module according to various embodiments of the present disclosure.

FIG. 3 is a block diagram illustrating a program module according to various embodiments of the present disclosure. According to an embodiment of the present disclosure, the program module 310 (e.g., the program 140) may include an OS to control resources relevant to an electronic device (e.g., the electronic device 101), and/or diverse applications (e.g., the application 147 of FIG. 1) driven on the OS. The OS may be, for example, android, iOS, windows, symbian, tizen, or bada.

Referring to FIG. 3 the program module 310 may include a kernel 320, middleware 330, and an API 360. At least a part of the program module 310 may be preloaded on an electronic device, or may be downloadable from another electronic device (e.g., the first external electronic device 102, the second external electronic device 104, or the server 106).

The kernel 320 (e.g., the kernel 141) may include, for example, a system resource manager 321 or a device driver 323. The system resource manager 321 may perform control, allocation, or retrieval of system resources. According to an embodiment of the present disclosure, the system resource manager 321 may include a process managing part, a memory managing part, or a file system managing part. The device driver 323 may include, for example, a display driver, a camera driver, a BT driver, a common memory driver, an USB driver, a keypad driver, a Wi-Fi driver, an audio driver, or an inter-process communication (IPC) driver.

The middleware 330 may provide, for example, a function necessary for the applications 370 in common, or provide diverse functions to the applications 370 through the API 360 to allow the applications 370 to efficiently use limited system resources of the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module which is used by a compiler to adding a new function through a programming language while the application 370 is being executed. The runtime library 335 may perform I/O management, memory management, or capacities about arithmetic functions.

The application manager 341 may manage, for example, a life cycle of at least one application of the application 370. The window manager 342 may manage a graphical user interface (GUI) resource which is used in a screen. The multimedia manager 343 may identify a format necessary for playing diverse media files, and perform an encoding or decoding work for media files by using a codec suitable for the format. The resource manager 344 may manage resources such as a storage space, memory, or source code of at least one application of the application 370.

The power manager 345, for example, may operate with a basic I/O system (BIOS) to manage a battery or power, and provide power information for an operation of an electronic device. The database manager 346 may generate, search, or modify a database which is to be used in at least one application of the application 370. The package manager 347 may install or update an application which is distributed in a form of package file.

The connectivity manager 348 may manage, for example, wireless connection such as Wi-Fi or BT. The notification manager 349 may display or notify an event such as arrival message, promise, or proximity notification in a mode that does not disturb a user. The location manager 350 may manage location information of an electronic device. The graphic manager 351 may manage a graphic effect that is provided to a user, or manage a user interface (UI) relevant thereto. The security manager 352 may provide a general security function necessary for system security or user authentication. According to an embodiment of the present disclosure, if an electronic device (e.g., the electronic device 101) includes a telephony function, the middleware 330 may further includes a telephony manager for managing a voice or image call function of the electronic device.

The middleware 330 may include a middleware module to form a combination of diverse functions of the above-described elements. The middleware 330 may provide a specialized module by a kind of OS in purpose of offering differentiated functions. Additionally, the middleware 330 may remove a part of the preexisting elements, dynamically, or add a new element thereto.

The API 360 (e.g., the API 145) may be, for example, a set of programming functions, and may be provided in a configuration which is variable depending on an OS. For example, if an OS is the android or the iOS, it may be permissible to provide one API set per platform. If an OS is the tizen, it may be permissible to two or more API sets per platform.

The application 370 (e.g., the application 147) may include, for example, one or more applications capable of providing functions for a home 371, a dialer 372, an short message service (SMS)/multimedia message service (MMS) 373, an instant message (IM) service 374, a browser 375, a camera 376, an alarm 377, a contact 378, a voice dial 379, an e-mail 380, a calendar 381, a media player 382, am album 383, and a timepiece (clock) 384, or for offering health care (e.g., measuring an exercise quantity or blood sugar) or environmental information (e.g., atmospheric pressure, humidity, or temperature).

According to an embodiment of the present disclosure, the application 370 may include an application (hereinafter, referred to as "information exchanging application" for descriptive convenience) to support information exchange between the electronic device (e.g., the electronic device 101) and another electronic device (e.g., the first external electronic device 102 or the second external electronic device 104). The information exchanging application may include, for example, a notification relay application for transmitting specific information to the external electronic device, or a device management application for managing the external electronic device.

For example, the notification relay application may include a function of transmitting notification information, which arise from other applications (e.g., the applications for SMS/MMS, e-mail, health care, or environmental information), to another electronic device (e.g., the first external electronic device 102 or the second external electronic device 104). Additionally, the notification relay application, for example, may receive notification information from an external electronic device and provide the notification information to a user.

The device management application may manage (e.g., install, delete, or update), for example, at least one function (e.g., the turn-on/turn-off of an external electronic device itself (or a part of components) or adjustment of brightness (or resolution) of a display) of another electronic device (e.g., the first external electronic device 102 or the second external electronic device 104) which communicates with the electronic device 100, an application operating in an external electronic device, or service (e.g., call service or message service) provided from an external electronic device.

According to an embodiment of the present disclosure, the application 370 may include an application (e.g., a health care application of a mobile medical device) which is assigned thereto in accordance with a property (e.g., a property of a mobile medical device as a kind of electronic device) of another electronic device (e.g., the first electronic device 102 or the second external electronic device 104). According to an embodiment of the present disclosure, the application 370 may include an application which is received from an external electronic device (e.g., the first electronic device 102, the second external electronic device 104, or the server 106). According to an embodiment of the present disclosure, the application 370 may include a pre-loaded application or a third party application which is downloadable from a server. The titles of the components in the program module 310 according to the illustrated embodiment may be modifiable depending on kinds of OSs.

According to various embodiments of the present disclosure, at least a part of the program module 310 may be implemented in software, firmware, hardware, or at least two or more combinations among them. At least a part of the program module 310, for example, may be implemented (e.g., executed) by a processor (e.g., the processor 210). At least a part of the program module 310 may include, for example, a module, a program, routine, a set of instructions, or a process for performing one or more functions.

Figure 4:
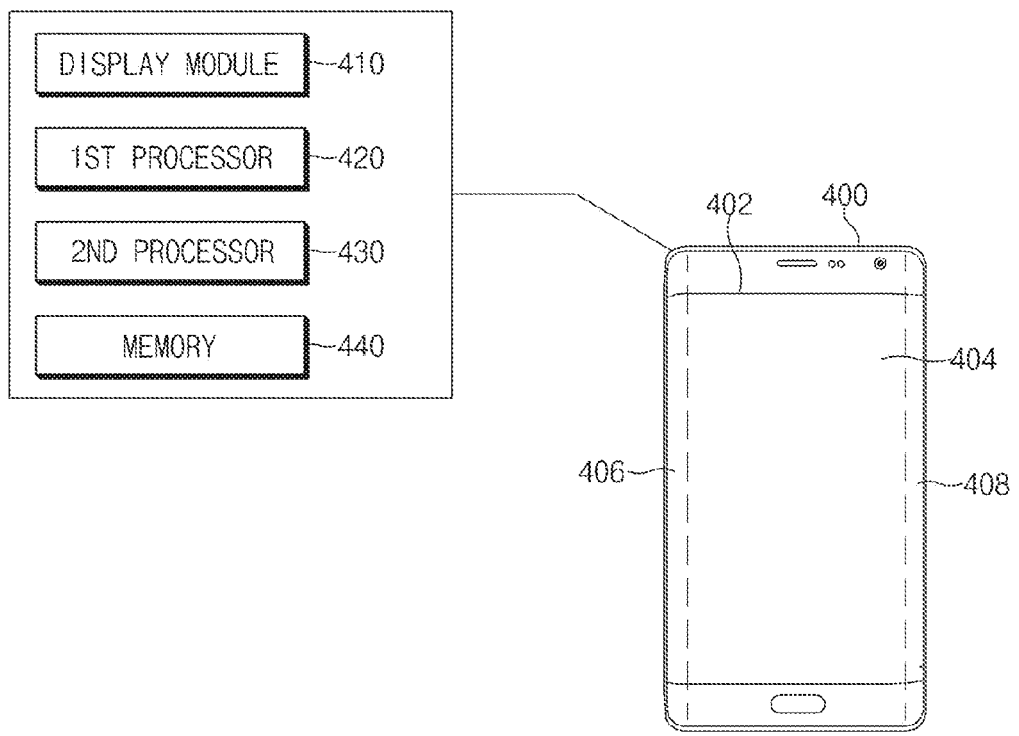
FIG. 4 is a block diagram illustrating an electronic device and at least a partial configuration included in the electronic device according to various embodiments of the present disclosure.

FIG. 4 is a block diagram illustrating an electronic device and at least a partial configuration included in the electronic device according to various embodiments of the present disclosure.

Referring to FIG. 4, an electronic device 400 may include a display module 410, a first processor 420, a second processor 430, and a memory 440. The configuration of the electronic device 400 shown in FIG. 4 may be merely one of embodiments and may be variable in diverse forms. For example, the electronic device 400 may further include a UI for receiving instructions and information from a user. In this case, the UI may be an input unit even such as keyboard or mouse, or may be also a UI (e.g., GUI) which is displayed in a display 402 (e.g., the display 140 of FIG. 1) of the electronic device 400.

The display 402 may include a flat area 404 and curved areas 406 and 408. According to various embodiments of the present disclosure, the flat area 404 and the curved areas 406 and 408 may be formed in a single display panel or may be separately formed in different display panels. Hereafter the display 402 may be exemplified as being formed in a unitary display panel.

According to various embodiments of the present disclosure, the display module 410 may display at least one or more contents in the display 402. The contents may include an image, a video, a home screen, a widget screen, and an application execution screen.

The display module 410 may display the at least one or more contents under control of the first processor 420 or the second processor 430.

According to various embodiments of the present disclosure, the first processor 420 or the second processor 430, for example, may be implemented with a SoC, and may include one or more of a CPU, a GPU, an ISP, an AP, or a CP. The first processor 420 or the second processor 430 may load instructions or data, which are received from at least one of other elements (e.g., the display module 410 and another processor (e.g., the first processor 420 or the second processor 430)), from the memory 440, may process the loaded instructions or data, and then may store various data in the memory 440.

The first processor 420 and the second processor 430 may be entities for performing designated operations by cooperation. The first processor 420 may act as a main processor while the second processor 430 may act as a sub processor. For example, the first processor 420 may generate a display screen to be provided to a user, and may request a display of the generated display screen from the second processor 430. The second processor 430 may display a display screen, which is received in response to a request of the first processor 420, in the display 402. The first processor 420 may be, for example, an AP while the second processor 430 may be, for example, a display driver IC. In this case, the second processor 430 may be included in the display module 410.

The first processor 420 may detect an operation performed in the electronic device 400, and may generate a display screen for the detected operation. The operation preformed in the electronic device 400 may be one of operations for displaying a home screen UI, displaying an application UI, displaying a side call UI. The side call UI may be displayed in the curved area 406 and/or 408 of the display 402.

Additionally, the first processor 420 may determine a range of display control authority, which is provided to the second processor 430, based on an operation performed in the electronic device 400. That is, the range of display control authority may be variable depending on operations performed in the electronic device 400. The range of display control authority may mean control authority for a partial area of the display 402.

The first processor 420, for example, may determine the range of display control authority under consideration about whether the electronic device 400 is operating in a horizontal orientation (landscape mode) or in a vertical orientation (portrait mode).

The second processor 430 may generate a display screen in a range of display control authority which is provided from the first processor 420. According to various embodiments of the present disclosure, the second processor 430 may be a display driver IC.

A display screen generated by the second processor 430 may be different from a display screen generated by the first processor 420. For the purpose of preventing confusion in terminology, a display screen generated by the first processor 420 will be hereafter referred to as 'first display screen' while a display screen generated by the second processor 430 will be referred to as 'second display screen'. A second display screen may not be restrictive to one screen and may include a plurality of separated screens. For example, the second display screen may include two separated screens which are respectively displayed in the curved areas 406 and 408.

The second processor 430 may analyze at least a part of the first display screen to generate the second display screen. At least a part of the first display screen may be, for example, an area adjacent to the range of display control authority. That is, the second processor 430 may generate the second display screen by analyzing an area of the first display screen which is displayed adjacent to the second display screen to be generated. In this case, as the second processor 430 uses at least a part of the analyzed second display screen to generate a second display screen, it may be possible to maintain consistency with the first display screen and the second display screen.

According to various embodiments of the prevent disclosure, the range of display control authority may include at least a part of the curved areas 406 and/or 408.

The second processor 430 may generate at least differently the second display screen based on a type of content which is displayed in the first display screen. Generating a second display screen 'at least differently' may mean generating the second display screen in different modes, for example, using different display effects.

A type of content may include, for example, a personal image, an actual image but the personal image, and a background image but nor the personal image or the actual image. For example, the second processor 430 may generate a second display screen by employing different effects in the case that a personal image is present in the first display screen and the case that a building image is present in the first display screen.

In the case that an area adjacent to a second display screen to be generated is a building area even though a personal image is present in a first display screen, the second processor 430 may generate the second display screen to harmonize a building as a type of content with the building area. That is, the type of content may be prepared for an area in the first display screen adjacent to the second display screen.

The second processor 430 may display a first display screen and a second display screen in the display 402.

The memory 440 may store, for example, instructions for operations which are performed in the first processor 420 or the second processor 430. In this case, data stored in the memory 440 may include data input and output between internal elements of the electronic device 400, and data input and output between the electronic device 400 and external elements of the electronic device 400.

The memory 440 may include an embedded memory or an external memory. The embedded memory may include, for example, at least one of volatile memory (e.g., DRAM, SRAM, or SDRAM), nonvolatile memory (e.g., OTROM, PROM, EPROM, EEPROM, NAND flash, or NOR flash), hard disk drive (HDD), or SSD.

The external memory may further include, for example, a flash drive such as CF, SD, micro-SD, mini-SD, extreme digital (xD), MMC, or memory stick. The external memory may be connected functionally and/or physically with the electronic device 400 through diverse interfaces.

Those skilled in the art may understand that the display module 410, the first processor 420, the second processor 430, and the memory 440 may be configured in separation and one or more of them may be integrated in one body.

Figure 5:
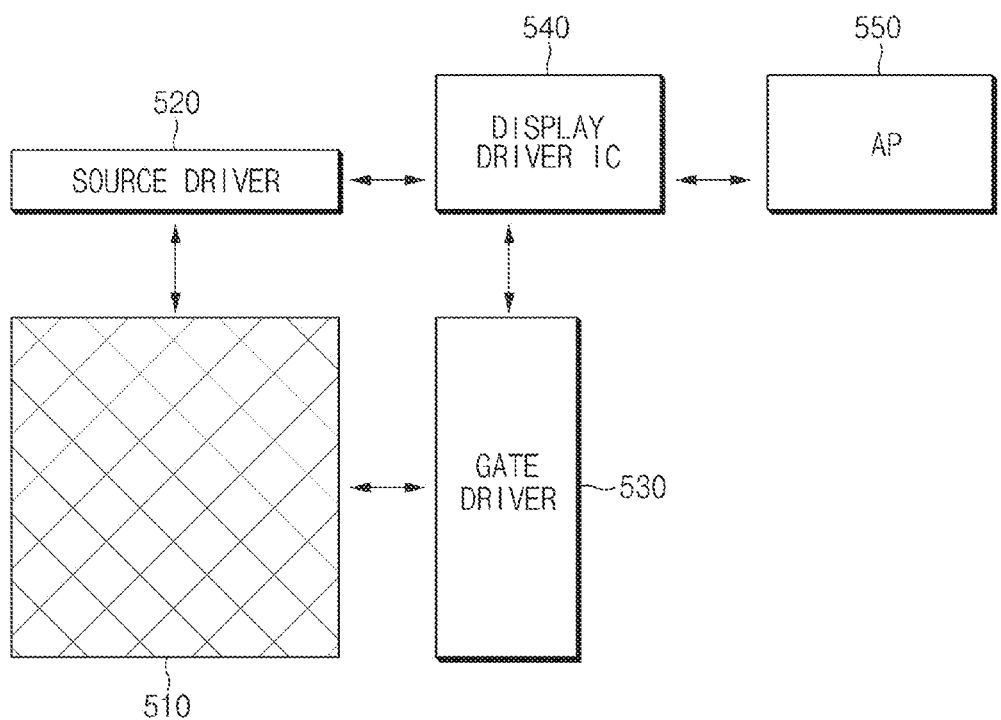
FIG. 5 illustrates a configuration relevant to a display of an electronic device according to various embodiments of the present disclosure.

FIG. 5 illustrates a configuration relevant to a display of an electronic device according to various embodiments of the present disclosure.

Referring to FIG. 5, an electronic device 400 may include a display panel 510, a source driver 520, a gate driver 530, a display driver IC 540, and an AP 550.

The display panel 510 may employ a LED to output diverse contents, allowing a user to view the various contents. The display panel 510 may be one corresponding to the display 402 of FIG. 4. For this configuration, the source driver 520 may supply voltages for respective color values of respective pixels of content to be displayed, and the gate driver 530 may receive the voltages and may supply voltages to the corresponding pixels.

The display driver IC 540 may correspond to the second processor 430 of FIG. 4 and the AP 550 may correspond to the first processor 420. The description relevant to FIG. 4 will not be duplicated hereafter.

Figure 6:
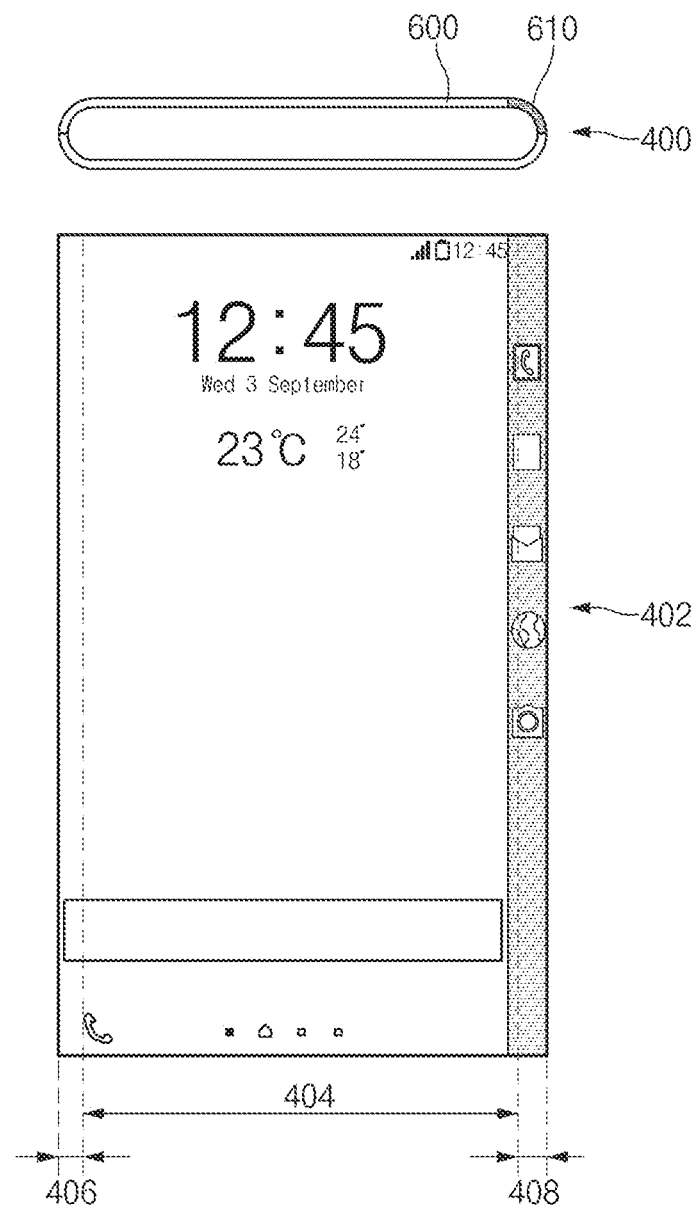
FIG. 6 illustrates a range of display control authority of a second processor in the case of providing a home screen user interface (UI) according to various embodiments of the present disclosure.

FIG. 6 illustrates a range of display control authority of a second processor in the case of providing a home screen UI according to various embodiments of the present disclosure. The upper figure of FIG. 6 illustrates a section of an electronic device 400, being shown by laying the lower figure of FIG. 6.

Referring to the upper and lower figures of FIG. 6, a display 402 may include a flat area 404 and curved areas 406 and 408. A home screen UI is displayed in the display 402. The display 402 may correspond to an area 600 shown of the upper part in FIG. 6. Additionally, a shortcut UI is displayed in the right area of the display 402, including the curved area 408, the right area corresponding to an area 610 of the upper figure of FIG. 6.

The area 600, as the whole display area of the electronic device 400 including the flat area 404 and the curved areas 406 and 408, may include an area 610 corresponding to the shortcut UI. According to various embodiments of the present disclosure, the areas 600 and the area 610 may be different areas which are independent from one another. For example, the area 610 may correspond to the shortcut UI and the area 600 may correspond to the rest display area except the shortcut UI. According to various embodiments of the present disclosure, the area 600 may correspond even to the flat area 404. According to various embodiments of the present disclosure, a first processor 420 may determine display control authority based on a detection that the home screen UI is being executed, and may provide the display control authority to a second processor 430. In the case of executing the home screen UI, the first processor 420 may not give display control authority to the second processor 430. In this case, the second processor 430 may display a display screen, which is received from the first processor 420, by rendering without changing (e.g., resizing) the display screen.

Figure 7:
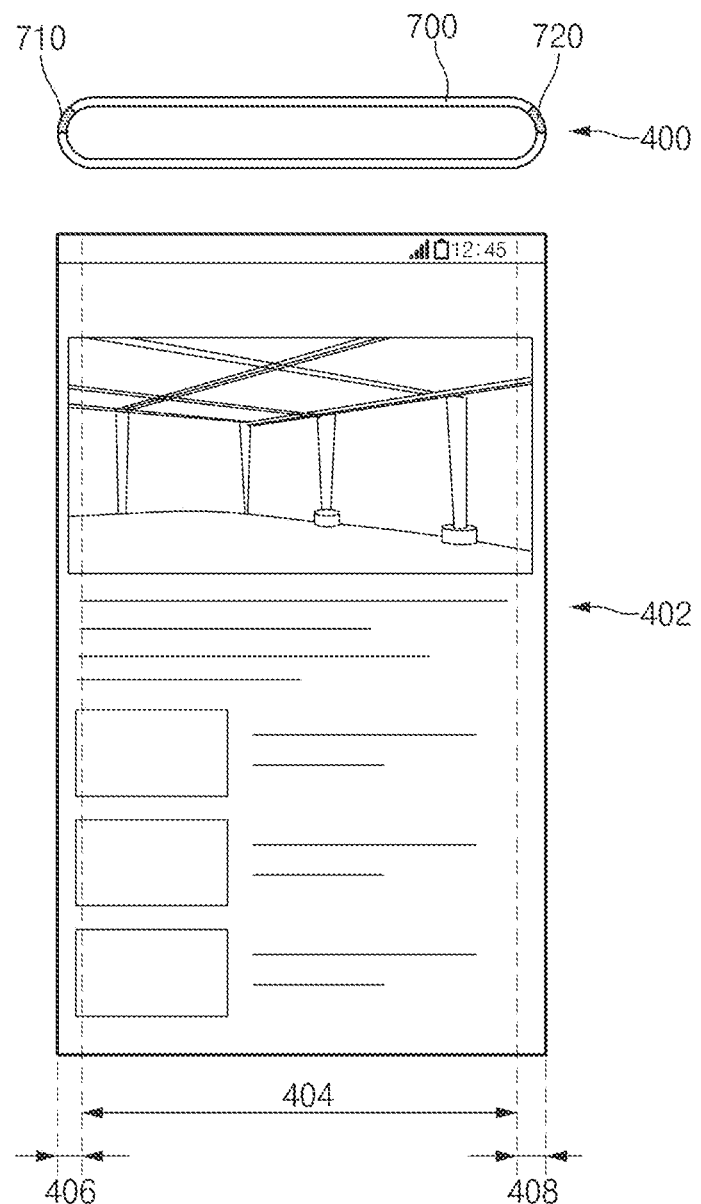
FIG. 7 illustrates a range of display control authority of a second processor in the case of providing an application UI according to various embodiments of the present disclosure.

FIG. 7 illustrates a range of display control authority of a second processor in the case of providing an application UI according to various embodiments of the present disclosure. The upper figure of FIG. 7 illustrates a section of an electronic device 400, being shown by the lower figure of FIG. 7.

Referring to the upper and lower figures of FIG. 7, a display 402 may include a flat area 404 and curved areas 406 and 408. A home screen UI is displayed in the display 402. The display 402 may correspond to an area 700 shown of the upper part in FIG. 7.

According to various embodiments of the prevent disclosure, a first processor 420 may determine display control authority based on detection about that the application UI is being executed, and may provide the display control authority to a second processor 430. In the case of executing the application UI, the first processor 420 may give display control authority for a first area 710 and a second area 720 to a second processor 430. In this case, the second processor 430 may modify (e.g., resize) a display screen, which is received from the first processor 420, to be fit for an area except the first area 710 and the second area 720. Additionally, the second processor 430 may generate a display screen, which is to be displayed in the first area 710 and the second area 720, and may display the display screen, which is to be displayed in the first area 710 and the second area 720, together with the modified display screen in the display 402.

The area 700, as the whole display area of the electronic device 400 including the flat area 404 and the curved areas 406 and 408, may include the first area 710 and the second area 720 which are provided with display control authority. According to various embodiments of the present disclosure, at least one of the area 700, the first area 710, and the second area 720 may be even independent from other areas. For example, the area 700 may correspond to the rest display area except the first area 710 and the second area 720 which are provided with the display control authority. According to various embodiments of the present disclosure, the area 700 may correspond even to the flat area 404.

Figure 8:
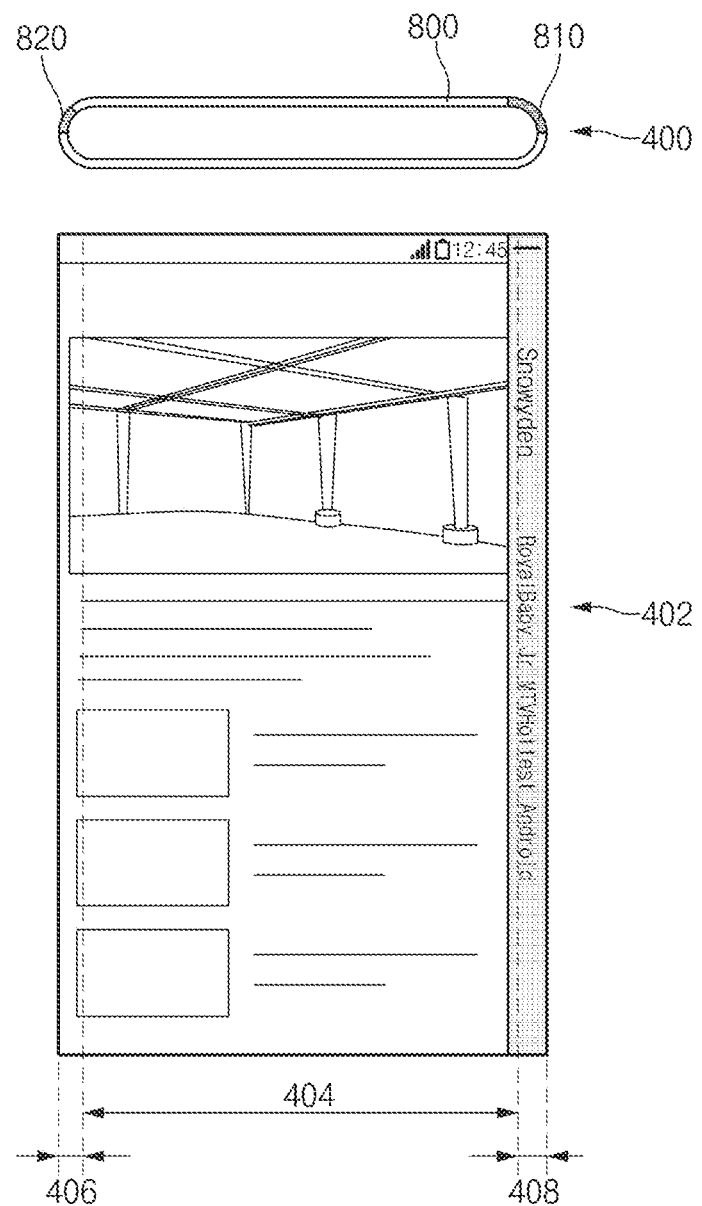
FIG. 8 illustrates a range of display control authority of a second processor in the case of providing a side call UI from the right according to various embodiments of the present disclosure.

FIG. 8 illustrates a range of display control authority of a second processor in the case of providing a side call UI from the right according to various embodiments of the present disclosure. The upper figure of FIG. 8 illustrates a section of an electronic device 400, being shown by the lower figure of FIG. 8.

Referring to the upper and lower figures of FIG. 8, a display 402 may include a flat area 404 and curved areas 406 and 408. An application UI is displayed in the display 402 and a side call UI is displayed at the upside of the application UI. The side call UI may correspond to the application which is being executed. For example, the side call UI may be displayed based in a user input which is dragged from the bezel. The display 402 may correspond to an area 800 of the upper figure of FIG. 8 and the side call UI may correspond to an area 810.

According to various embodiments of the present disclosure, a first processor 420 may determine display control authority based on detection about that the application UI is being executed, and may provide the display control authority to a second processor 430. In the case of executing the application UI, the first processor 420 may give display control authority for an area 820 to a second processor 430. In this case, the second processor 430 may modify (e.g., resize) a display screen, which is received from the first processor 420, to be fit for an area except the area 820. In this case, the second processor 430 may even modify only a size of the application UI without modifying a size of the side call UI.

The area 800, as the whole display area of the electronic device 400 including the flat area 404 and the curved areas 406 and 408, may include the area 810, which corresponds to the side call UI, and the area 820 which is provided with display control authority. According to various embodiments of the present disclosure, at least one of the area 800, the area 810, and the area 820 may be even independent from other areas. For example, the area 800 may correspond to the rest display area except the area 810, which correspond to the side call UI, and the area 820 which is provided with the display control authority. According to various embodiments of the present disclosure, the area 800 may correspond even to the flat area 404.

The second processor 430 may generate a display screen to be displayed in the area 820 and may display the display screen, which is to be displayed in the area 820, in the display 420 together with a display screen which is at least partly modified.

Figure 9:
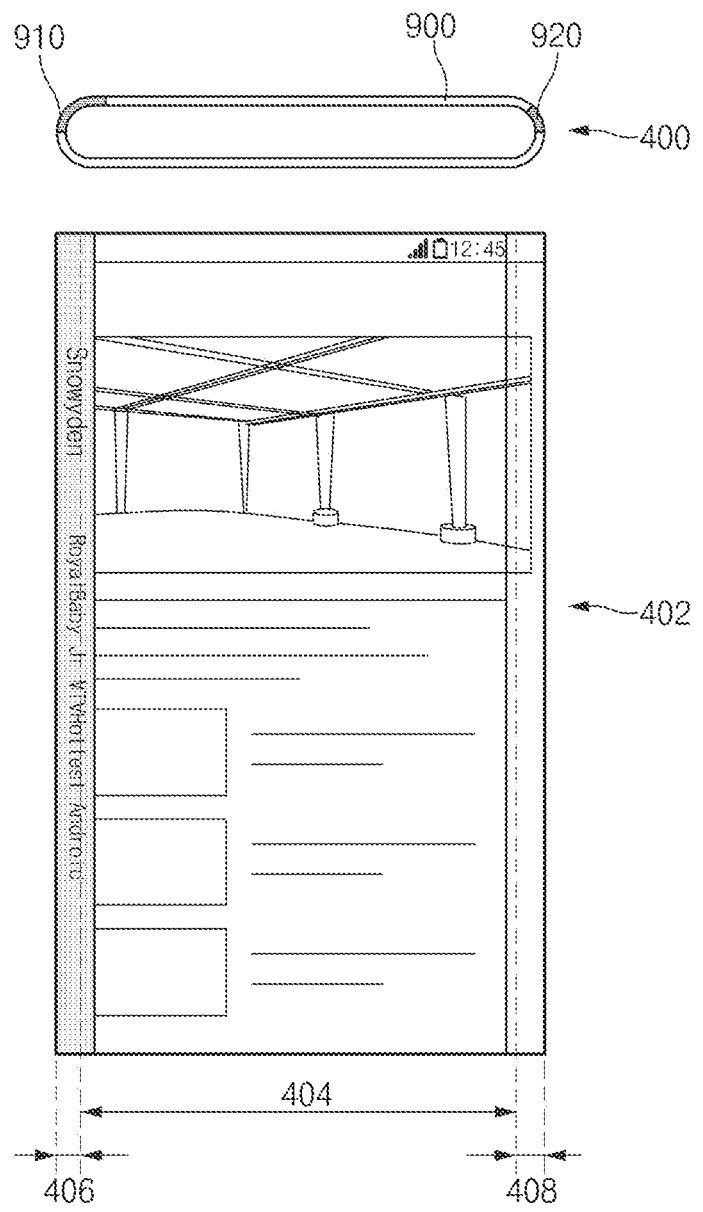
FIG. 9 illustrates a range of display control authority of a second processor in the case of providing a side call UI from the left according to various embodiments of the present disclosure.

FIG. 9 illustrates a range of display control authority of a second processor in the case of providing a side call UI from the left according to various embodiments of the present disclosure.

Referring to FIG. 9, FIG. 9 may correspond to FIG. 8 but in the direction of providing the side call UI. Referring to the upper and lower figures of FIG. 9, a display 402 may include a flat area 404 and curved areas 406 and 408. An application UI is displayed in the display 402 and a side call UI is displayed at the upside of the application UI. The side call UI may correspond to the application which is being executed. For example, the side call UI may be displayed based in a user input which is dragged from the bezel. The display 402 may correspond to an area 900 of the upper figure of FIG. 9 and the side call UI may correspond to an area 910. Accordingly, a first processor 420 may detect that the side call UI is executed at the left of a screen 402 and may provide display control authority for a right area 920 of the screen 402 to a second processor 430.

The description stated in conjunction with FIG. 8 will not be duplicated hereafter.

Figure 10:
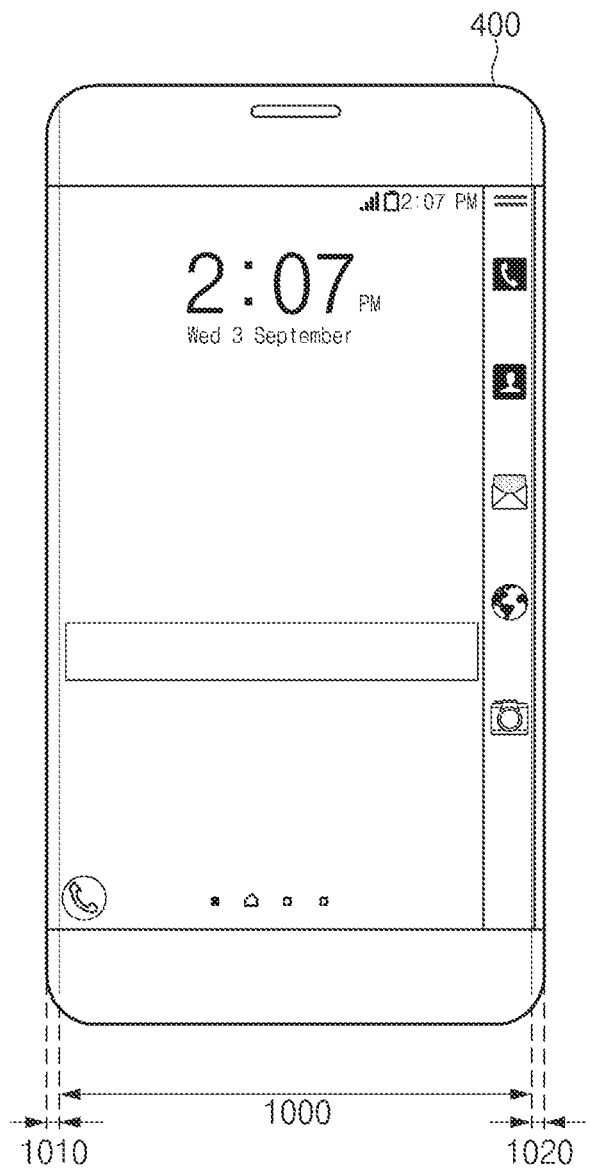
FIG. 10 illustrates a display screen determined in a range of display control authority by a second processor in the case of providing a home screen UI according to various embodiments of the present disclosure.

FIG. 10 illustrates a display screen determined in a range of display control authority by a second processor in the case of providing a home screen UI according to various embodiments of the present disclosure.

Referring to FIG. 10, areas 1000, 1010, and 1020 may be illustrated as areas, which are controllable by a first processor 420 and a second processor 430, for reference when an application UI is being executed.

As aforementioned with FIG. 6, the second processor 430 in the case of executing the home screen UI may not be provided with display control authority for at least a part of a display. In this case, the second processor 430 may directly display a display screen, which is generated from the first processor 420, in a display 402. Accordingly, display screens for the areas 1010 and 1020 may not be prepared additionally.

Figure 11:
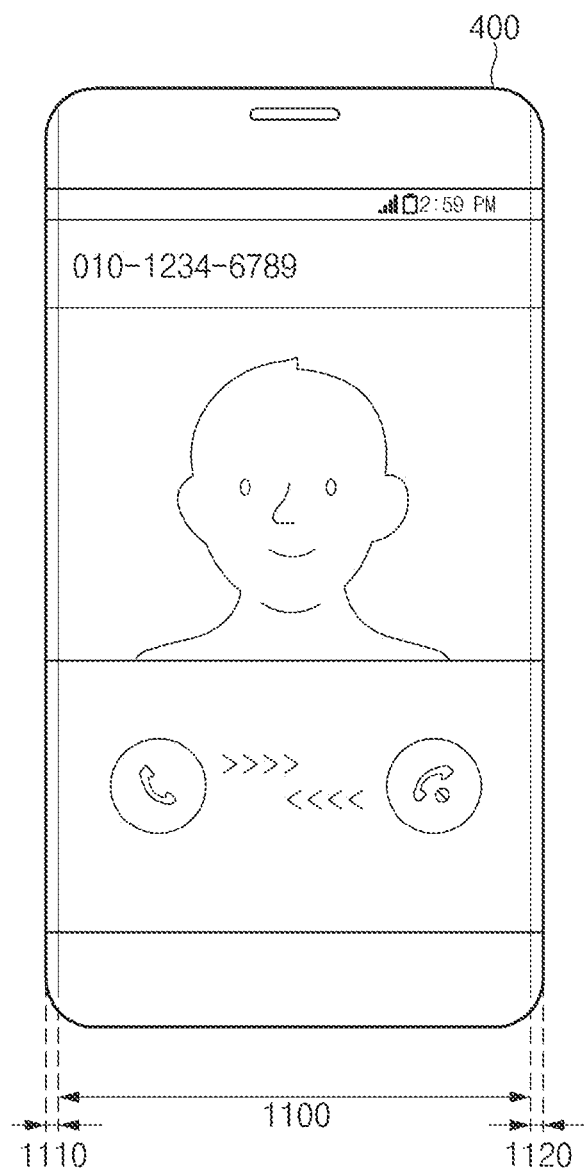
FIG. 11 illustrates a display screen determined in a range of display control authority by a second processor in the case of providing an UI background image from an application UI according to various embodiments of the present disclosure.

FIG. 11 illustrates a display screen determined in a range of display control authority by a second processor in the case of providing an UI background image from an application UI according to various embodiments of the present disclosure. Areas 1100, 1110, and 1120 may be illustrated as areas, which are controllable by a first processor 420 and a second processor 430, when the application UI is being executed.

Referring to FIG. 11, the second processor 430 may generate a display screen to be displayed in the areas 1110 and 1120. For this, the second processor 430 may analyze a partial area of the area 1100 adjacent to the area 1110 and may generate a display screen to be displayed in the area 1110. Similarly, the second processor 430 may analyze a partial area of the area 1100 adjacent to the area 1120 and may generate a display screen to be displayed in the area 1120.

The second processor 430 may check a type of content, which is displayed in the application UI, to generate a display screen for the areas 1110 and 1120. The second processor 430 may directly check the type of content and the first processor 420 may even receive the corresponding information.

The second processor 430 may detect that the type of content is a background UI but an actual image, and may generate a display screen in the manner of directly extending a color, which is displayed in a partial area of the area 1100 adjacent to the area 1110, to the area 1110. The second processor 430 may generate a display screen for the area 1120 in the same manner.

Figure 12:
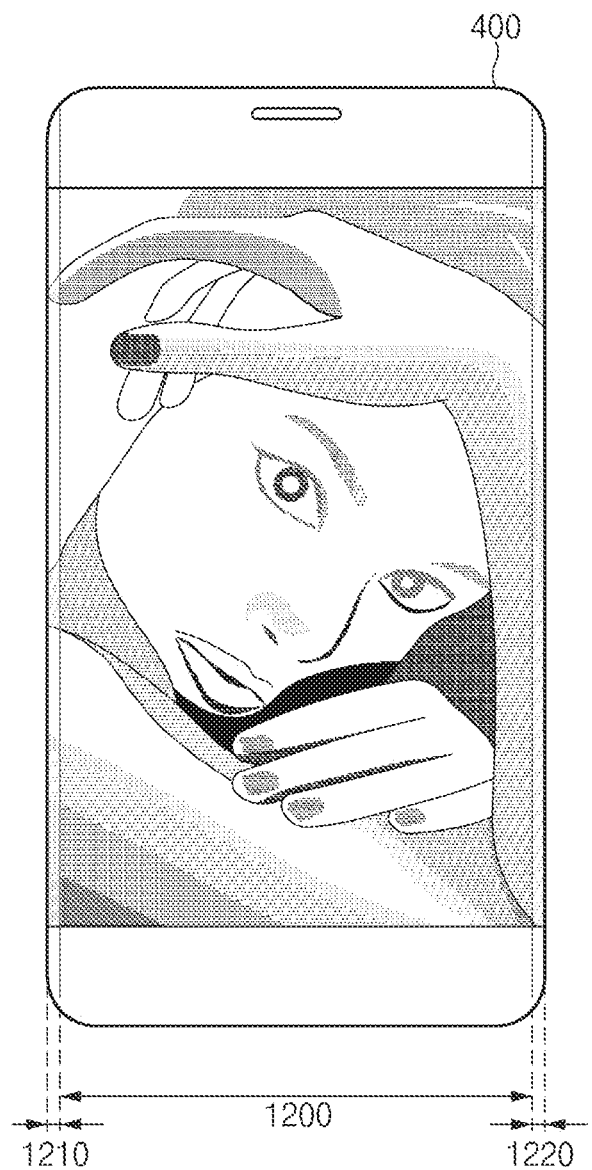
FIG. 12 illustrates a display screen determined in a range of display control authority by a second processor in the case of providing a personal image from an application UI according to various embodiments of the present disclosure.

FIG. 12 illustrates a display screen determined in a range of display control authority by a second processor in the case of providing a personal image from an application UI according to various embodiments of the present disclosure. Areas 1200, 1210, and 1220 may be illustrated as areas, which are controllable by a first processor 420 and a second processor 430, when the application UI is being executed.

Referring to FIG. 12, the second processor 430 may generate a display screen to be displayed in the areas 1210 and 1220. For this, the second processor 430 may analyze a partial area of the area 1200 adjacent to the area 1210 and may generate a display screen to be displayed in the area 1210. Similarly, the second processor 430 may analyze a partial area of the area 1200 adjacent to the area 1220 and may generate a display screen to be displayed in the area 1220.

The second processor 430 may check a type of content, which is displayed in the application UI, to generate a display screen for the areas 1210 and 1220. The second processor 430 may directly check the type of content and the first processor 420 may even receive the corresponding information.

The second processor 430 may detect that the type of content is a personal image, and may generate a display screen by blurring a partial area of the area 1200 adjacent to the area 1210. The second processor 430 may generate a display screen for the area 1220 in the same manner. For example, the second processor 430 may cut out a display screen, which is received from the first processor 420, by the portions of the areas 1210 and 1220, without resizing the display screen, and may generate a display screen by blurring the cut-out portions.

Figures 13A, 13B:
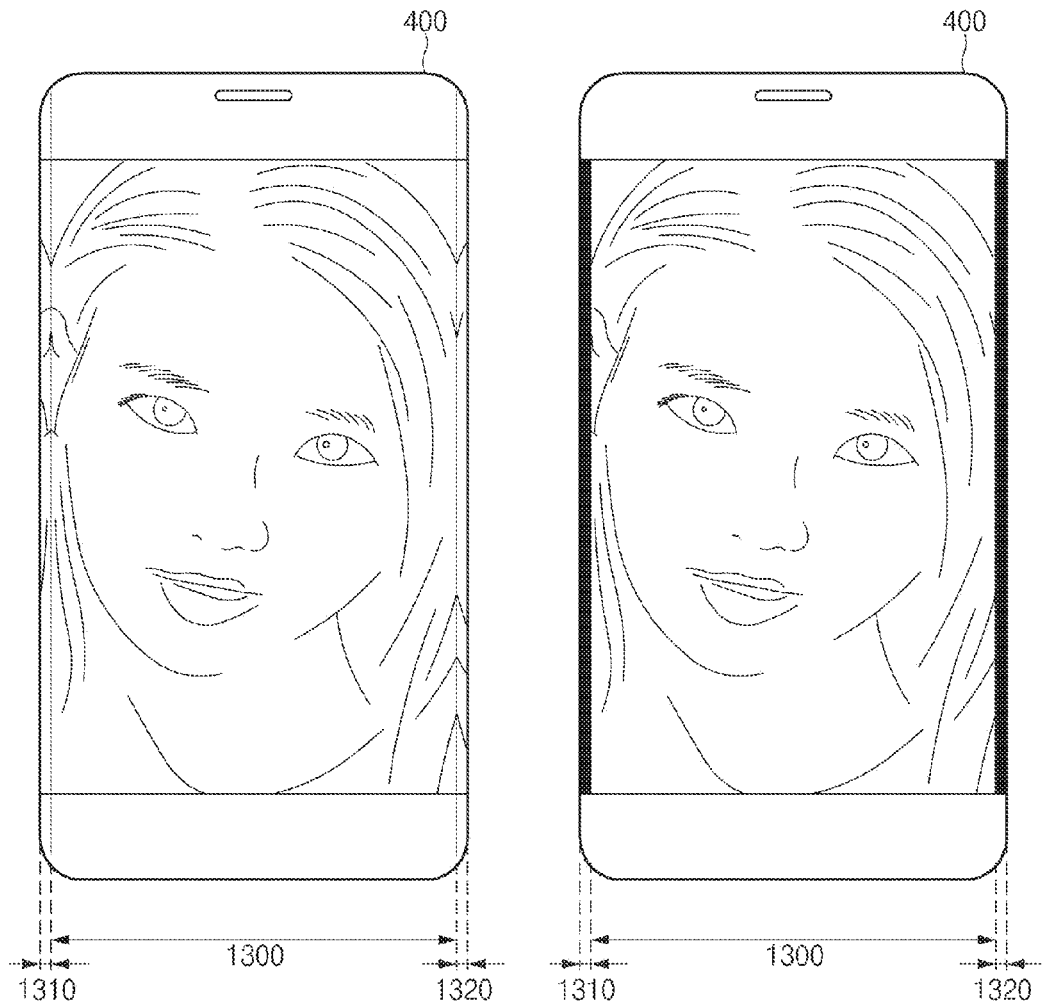
FIGS. 13A and 13B illustrate display screens determined in a range of display control authority by a second processor in the case of providing personal images from an application UI according to various embodiments of the present disclosure.

FIGS. 13A and 13B illustrate display screens determined in a range of display control authority by a second processor in the case of providing personal images from an application UI according to various embodiments of the present disclosure. Areas 1300, 1310, and 1320 may be illustrated as areas, which are controllable by a first processor 420 and a second processor 430, when the application UI is being executed. FIGS. 13A and 13B illustrate personal images in correspondence with FIG. 12.

Referring to FIGS. 13A and 13B, the second processor 430 may generate a display screen through diverse effects in the similar manner of generating a display screen by the blurring.

For example, as illustrated in FIG. 13A, the second processor 430 may generate a display screen through a mirroring process. For a personal image, as this effect may cause a user to be inconvenienced, the second processor 430 may even generate a black display screen as illustrated in FIG. 13B.

Figure 14:
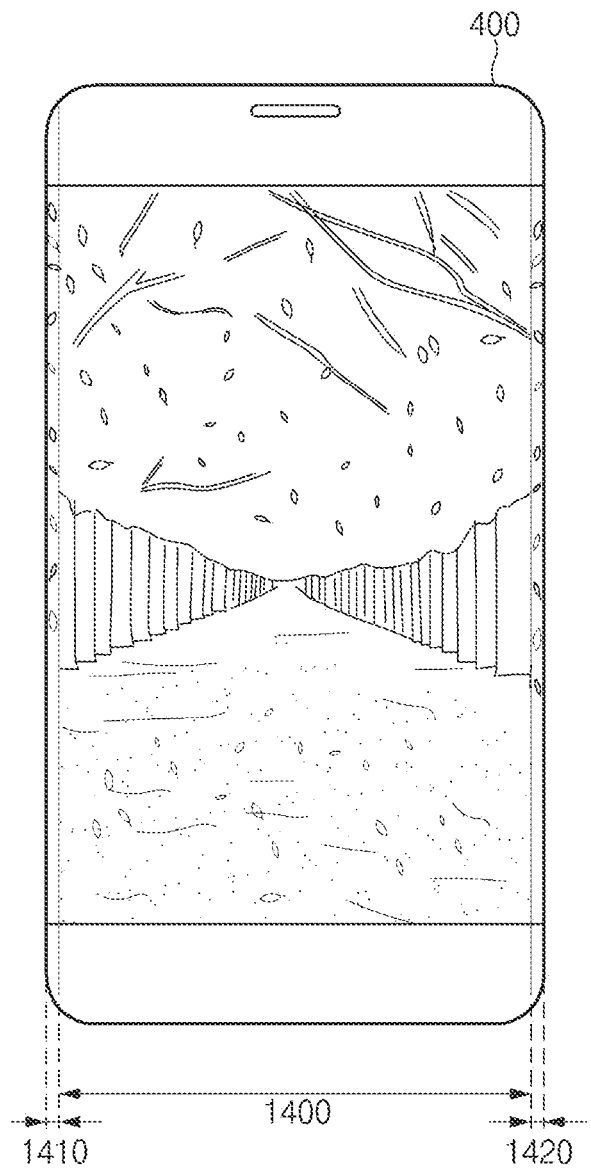
FIG. 14 illustrates a display screen determined in a range of display control authority by a second processor in the case of providing an actual image from an application UI according to various embodiments of the present disclosure.

FIG. 14 illustrates a display screen determined in a range of display control authority by a second processor in the case of providing an actual image from an application UI according to various embodiments of the present disclosure. Areas 1400, 1410, and 1420 may be illustrated as areas, which are controllable by a first processor 420 and a second processor 430, when the application UI is being executed.

Referring to FIG. 14, the second processor 430 may generate a display screen to be displayed in the areas 1410 and 1420. For this, the second processor 430 may analyze a partial area of the area 1400 adjacent to the area 1410 and may generate a display screen to be displayed in the area 1410. Similarly, the second processor 430 may analyze a partial area of the area 1400 adjacent to the area 1420 and may generate a display screen to be displayed in the area 1420.

The second processor 430 may check a type of content, which is displayed in the application UI, to generate a display screen for the areas 1410 and 1420. The second processor 430 may directly check the type of content and the first processor 420 may even receive the corresponding information.

The second processor 430 may detect that the type of content is an actual image but a personal image, and may generate a display screen which generates particles. The particles may be generated by referring colors and objects which appear through the whole of the area 1400 or an area adjacent to the area 1410. The second processor 430 may generate a display screen even for the area 1420 in the same manner.

Figure 15:
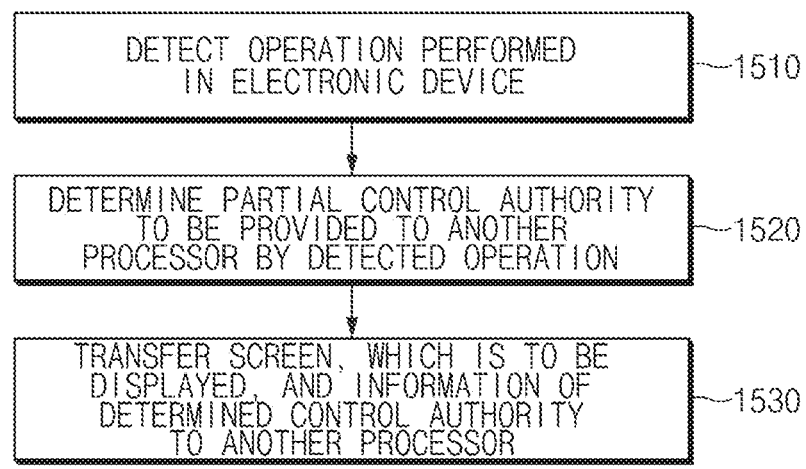
FIG. 15 is a flow chart showing a method for determining a range of display control authority by a first processor of an electronic device according to various embodiments of the present disclosure.

FIG. 15 is a flow chart showing a method for determining a range of display control authority by a first processor of an electronic device according to various embodiments of the present disclosure. A method for determining a range of display control authority by a first processor, shown in FIG. 15, may be performed in the electronic device 400 described with FIGS. 1 to 12, 13A, 13B, and 14. Accordingly, even description omitted below may be also applicable to FIG. 15 in a method for determining a range of display control authority by a first processor of the electronic device which is described in conjunction with FIGS. 1 to 12, 13A, 13B, and 14.

Referring to FIG. 15, in operation 1510, the first processor 420 may detect an operation performed in the electronic device 400.

In operation 1520, the first processor 420 may determine a part of display control authority, which is to be provided to a second processor 430, in accordance with the operation detected in the operation 1510.

In operation 1530, the first processor 420 may transfer a display screen, which is to be displayed in a display 402, and information of display control authority, which is determined in the operation 1520.

Figure 16:
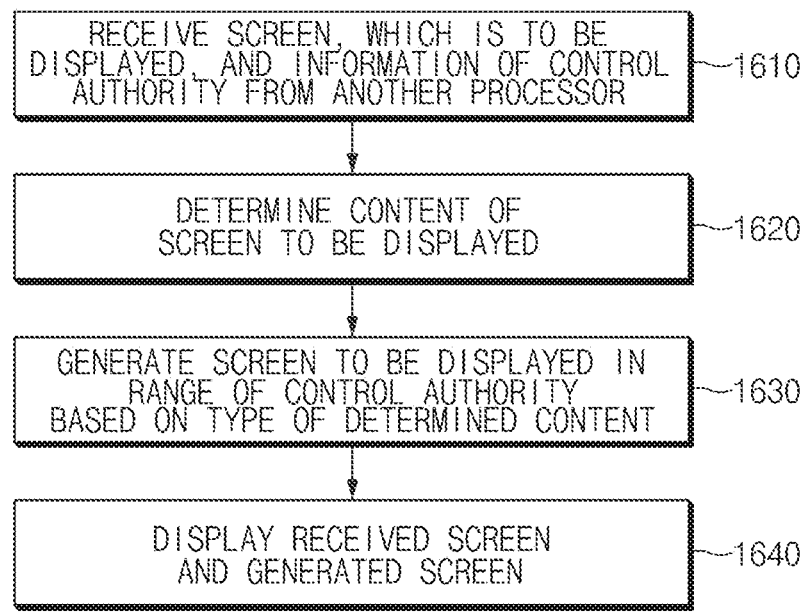
FIG. 16 is a flow chart showing a method for generating and providing a display screen in a range of display control authority by a second processor of an electronic device according to various embodiments of the present disclosure.

FIG. 16 is a flow chart showing a method for generating and providing a display screen in a range of display control authority by a second processor of an electronic device according to various embodiments of the present disclosure. A method for generating and providing a display screen in a range of display control authority by a second processor of an electronic device, shown in FIG. 16, may be performed in the electronic device 400 described with FIGS. 1 to 12, 13A, 13B, and 14. Accordingly, even description omitted below may be also applicable to FIG. 16 in a method for generating and providing a display screen in a range of display control authority by a second processor of the electronic device which is described in conjunction with FIGS. 1 to 12, 13A, 13B, and 14.

Referring to FIG. 16, in operation 1610, a second processor 430 may receive a display screen and information of display control authority from a first processor 420.

In operation 1620, the second processor 430 may determine a type of content of the display screen which is received in the operation 1610.

In operation 1630, the second processor 430 may generate a display screen by itself in the range of display control authority based on a type of content which is determined in the operation 1620.

In operation 1640, the second processor 430 may display a display screen, which is received in the operation 1610, and a display screen, which is generated in the operation 1630, in the display 402.

The term "module" used for the present disclosure, for example, may mean a unit including one of hardware, software, and firmware or a combination of two or more thereof. A "module", for example, may be interchangeably used with terminologies such as a unit, logic, a logical block, a component, a circuit, etc. The "module" may be a minimum unit of a component integrally configured or a part thereof. The "module" may be a minimum unit performing one or more functions or a portion thereof. The "module" may be implemented mechanically or electronically. For example, the "module" according to various embodiments of the present disclosure may include at least one of an application-specific integrated circuit (ASIC) chip performing certain operations, a field-programmable gate arrays (FPGAs), or a programmable-logic device, those of which have been known or to be developed in the future.

At least a part of an apparatus (e.g., modules or functions thereof) or a method (e.g., operations) according to various embodiments of the present disclosure, for example, may be implemented by instructions stored in a computer-readable storage medium in the form of a programmable module. The instructions, when executed by a processor (e.g., the processor 120), may perform a function corresponding to the instructions. Such a computer-readable medium may be, for example, the memory 130.

The computer-readable recording medium may include a hard disk, a magnetic media such as a floppy disk and a magnetic tape, an optical media such as compact disc ROM (CD-ROM) and a DVD, a magneto-optical media such as a floptical disk, and the following hardware devices specifically configured to store and perform a program instruction (e.g., a programming module): ROM, RAM, and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to various embodiments of the present disclosure may include at least one of the above elements, or a part of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added thereto.

According to at least one of the solutions of the present disclosure, it may be allowable for an electronic device and method according to various embodiments of the present disclosure to independently control multiple areas of a display. For example, according to various embodiments of the present disclosure, a main area (an area which is relatively wide and much variable in screen) of a display of an electronic device may be controlled by a main processor but a sub area may be controlled by a sub processor.

According to various embodiments of the present disclosure, it may be allowable to reduce overall power consumption because a sub processor consumes less power than a main processor. Additionally, since a sub processor generates a display screen (a sub display screen) by itself based on at least a part of a display screen (a main display screen) which is generated by a main processor, it may be accomplishable to provide many effects in consistency with the main display screen.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a display comprising:
        a first display area, and
        a second display area, the first display area being larger than the second display area; and
    an application processor and a display driver integrated circuit (DDI) that are electrically connected with the display, the DDI consuming less power than the application processor,
    wherein the application processor is configured to:
        generate a first display screen,
        detect an operation for displaying a home screen user interface (UI), for displaying an application UI, or for displaying a side call UI performed in the electronic device,
        transfer the first display screen to the DDI in response to the detected operation for displaying the home screen UI, for displaying the application UI, or for displaying the side call UI,
        determine a range of display control authority to be provided to the DDI according to the detected operation for displaying the home screen UI, for displaying the application UI, or for displaying the side call UI, the range of the display control authority defining the second display area, the second display area including at least a part of at least one curved area of the display, the application processor determining the range of display control authority based on a determination whether the electronic device is operating in a horizontal orientation or in a vertical orientation, and
        provide the range of the display control authority to the DDI, and wherein the DDI is configured to:
        generate a second display screen corresponding to the range of the display control authority based on the first display screen,
        display the first display screen on the first display area, and
        display the second display screen on the second display area,
    wherein the DDI generates the second display screen using different display effects based on a type of content which is displayed in the first display screen.

2. The electronic device of claim 1,
    wherein the DDI is further configured to:
        resize the transferred first display screen, and
        provide the resized first display screen on the first display area.

3. The electronic device of claim 2, wherein the second display screen generated by the DDI is generated based at least in part on a type of content displayed on the transferred first display screen.

4. The electronic device of claim 3, wherein the type of the content comprises one of a personal image, an actual image which is not the personal image, or a UI background image which is neither the personal image nor the actual image.

5. The electronic device of claim 4, wherein the type of the content is associated with an area of the transferred first display screen adjacent to the second display screen generated by the DDI.

6. The electronic device of claim 2, wherein the DDI is further configured to generate the second display screen by analyzing at least a part of the transferred first display screen.

7. The electronic device of claim 6, wherein at least a part of the transferred first display screen, which is analyzed, is an area of the transferred first display screen adjacent to the second display screen generated by the DDI.

8. The electronic device of claim 1, further comprising:
    the display including a flat area and the at least one curved area,
    wherein a shortcut UI is displayed in the at least one curved area.

9. The electronic device of claim 8, wherein the range of the display control authority comprises at least a part of the at least one curved area.

10. The electronic device of claim 1, wherein the application processor is further configured to determine the range of the display control authority according to whether the electronic device is operating in a landscape mode or a portrait mode.

11. A method performed in an electronic device including a display comprising a first display area and a second display area, the first display area being larger than the second display area, an application processor and a display driver integrated circuit (DDI), the DDI consuming less power than the application processor, the method comprising:
    generating a first display screen;

detecting an operation for displaying a home screen user interface (UI), for displaying an application UI, or for displaying a side call UI, which is performed in the electronic device, by the application processor;

transferring the first display screen to the DDI in response to the detected operation for displaying the home screen UI, for displaying the application UI, or for displaying the side call UI, by the application processor;

determining a range of display control authority to be provided to the DDI by the application processor according to the detected operation for displaying the home screen UI, for displaying the application UI, or for displaying the side call UI, the range of the display control authority defining the second display area, the second display area including at least a part of at least one curved area of the display, the application processor determining the range of display control authority based on a determination whether the electronic device is operating in a horizontal orientation (landscape mode) or in a vertical orientation (portrait mode);

generating a second display screen by the DDI in correspondence with the range of the display control authority based on the first display screen;

displaying the first display screen on the first display area, by the DDI; and displaying the second display screen on the second display area, wherein the DDI generates the second display screen using different display effects based on a type of content which is displayed in the first display screen.

12. The method of claim 11, further comprising:

resizing the transferred first display screen by the DDI; and displaying the resized first display screen on the first area, by the DDI.

13. The method of claim 12, wherein the range of the display control authority indicates at least a partial area of the display.

* * * * *